United States Patent
Kajihara

(10) Patent No.: US 7,809,071 B2
(45) Date of Patent: Oct. 5, 2010

(54) WIRELESS COMMUNICATION RECEIVING DEVICE AND WIRELESS COMMUNICATION SYSTEM

(75) Inventor: Hirotsugu Kajihara, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 506 days.

(21) Appl. No.: 11/968,423

(22) Filed: Jan. 2, 2008

(65) Prior Publication Data

US 2008/0165878 A1    Jul. 10, 2008

(30) Foreign Application Priority Data

Jan. 9, 2007    (JP)    ................... 2007-001590

(51) Int. Cl.
  *H04L 1/02* (2006.01)
(52) U.S. Cl. ................ 375/264; 375/262; 375/341; 714/795
(58) Field of Classification Search ......... 375/262–264, 375/341; 714/795
  See application file for complete search history.

(56) References Cited

U.S. PATENT DOCUMENTS

| | | |
|---|---|---|
| 2004/0013205 A1 | 1/2004 | Brunel |
| 2004/0181419 A1 | 9/2004 | Davis et al. |
| 2005/0094742 A1* | 5/2005 | Yee ........................... 375/267 |
| 2005/0135498 A1* | 6/2005 | Yee ........................... 375/267 |
| 2006/0198470 A1 | 9/2006 | Yu |
| 2007/0110195 A1 | 5/2007 | Kajihara |

OTHER PUBLICATIONS

Emanuele Viterbo, et al., "A Universal Lattice Code Decoder for Fading Channels", IEEE Transactions on Information Theory, vol. 45, No. 5, Jul. 1999, pp. 1639-1642.
Albert M. Chan, et al., "A New Reduced-Complexity Sphere Decoder for Multiple Antenna Systems", IEEE International Conference, vol. 1, 2002, pp. 460-464.

* cited by examiner

*Primary Examiner*—Temesghen Ghebretinsae
(74) *Attorney, Agent, or Firm*—Oblon, Spivak, McClelland, Maier & Neustadt, L.L.P.

(57) ABSTRACT

A wireless communication receiving device includes an initializing section for obtaining a temporary solution from a transmission route estimation value and a reception signal, a solution candidate calculating section for obtaining a solution candidate for each dimension existing inside a search area around the temporary solution, a solution candidate selecting section for deleting a solution candidate a cumulative distance of which is large when the number of solution candidates exceeds a specified resource number, a distance calculating section for obtaining a partial distance between the temporary solution and the solution candidate for each dimension, and a cumulative distance of the obtained partial distances, and a distance comparing section.

20 Claims, 9 Drawing Sheets

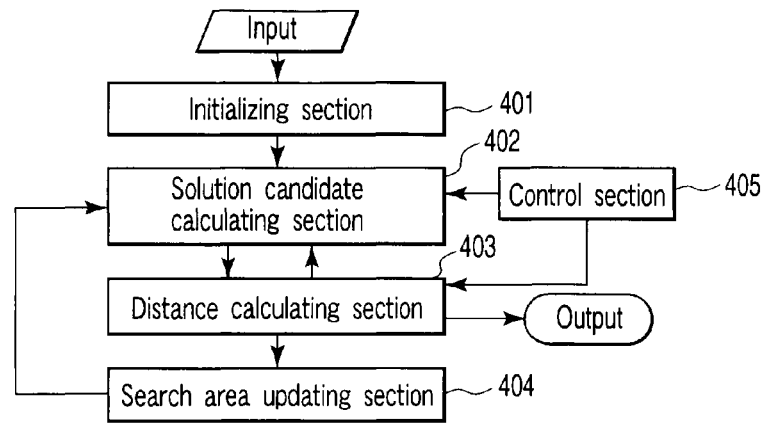
F I G. 1 2
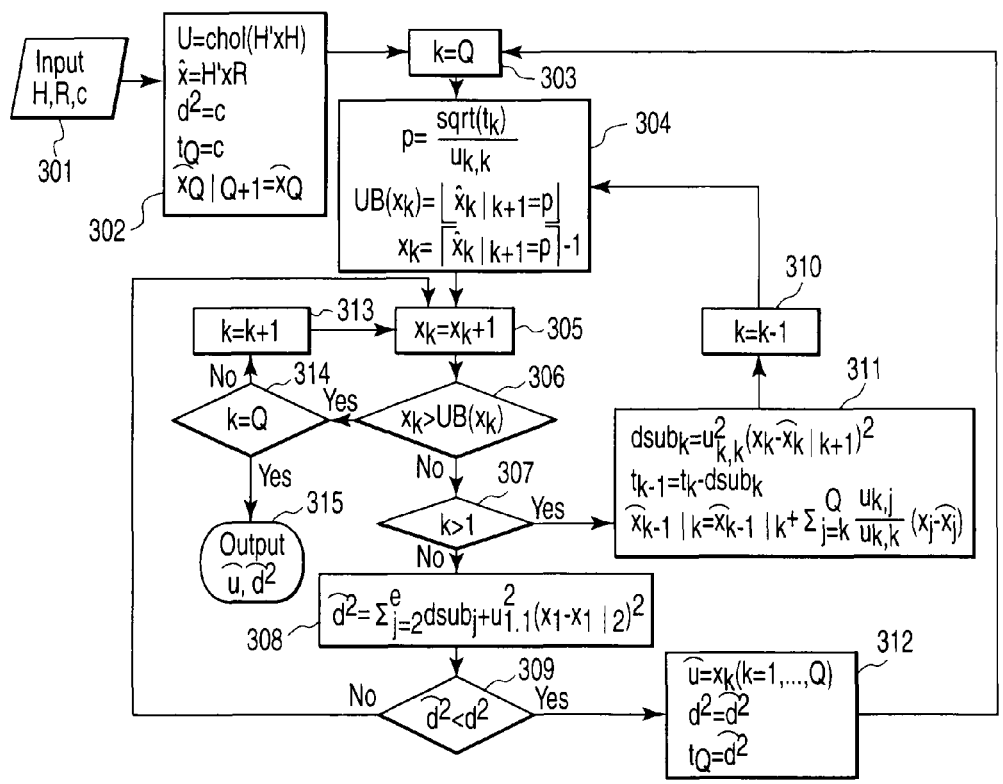
F I G. 1 3

WIRELESS COMMUNICATION RECEIVING DEVICE AND WIRELESS COMMUNICATION SYSTEM

CROSS-REFERENCE TO RELATED APPLICATIONS

This application is based upon and claims the benefit of priority from prior Japanese Patent Application No. 2007-001590, filed Jan. 9, 2007, the entire contents of which are incorporated herein by reference.

BACKGROUND OF THE INVENTION

1. Field of the Invention

The present invention relates to a wireless communication receiving device and a wireless communication system, which are applied to, for example, a sphere decoder or the like of a communication equipment using space division multiplexing in the case of a closest approach point of a lattice code (SDM code) in information communication.

2. Description of the Related Art

Heretofore, for example, a search algorithm for a communication equipment using space division multiplexing in the case of a closest approach point of a lattice code in information communication is disclosed. These techniques are described in the following Document 1, Document 2, and the like. Description will be given by taking Document 1 and Document 2 as an example.

1. Document 1

A universal lattice code decoder for fading channels Viterbo, E.; Bouros, J.; Information Theory, IEEE Transactions on, Volume: 45, Issue: 5, Jul. 1999 Pages: 1639-1642

A sphere decoder shown in, for example, in FIG. 2 of Document 1, is of a tree search algorithm for narrowing down the solution candidate points while narrowing the search area. According to this search algorithm, the solution candidate points are narrowed down while the search area is narrowed down, and hence decoding accuracy substantially equal to maximum likelihood determination can be achieved by a very small calculation amount as compared with total solution search.

However, this search algorithm is a complicated tree search algorithm requiring a large number of comparison determination steps, and hence control is complicated, and the operation range increases or decreases depending on the comparison determination step, and the operation range therefore varies. For this reason, the processing time of the decoding operation has a tendency to become unable to be made constant.

Furthermore, since it is a complicated tree search algorithm that requires a large number of comparison determination steps, the control is complicated, and hence pipeline processing of the decoding operation also tends to be unable to be performed.

Moreover, the conventional receiving device is not suited to realtime processing, and a dedicated circuit or the like is required, and hence the circuit size is increased and power consumption is also increased.

For example, in this algorithm, when a reception signal is input in synchronization with a 20 MHz clock, even if decoding can be completed within 10 clock pulses on the average, or within 20 clock pulses in the worst case, the operation must be performed at 400 MHz so as to perform realtime processing for the worst case. Further, while the tree search is performed, decoding processing for the next signal cannot be performed, and hence a contrivance for preparation of a buffer for reception signal, and a contrivance for preparation of plural processing systems are required.

2. Document 2

A new reduced-complexity sphere decoder for multiple antenna systems Chan, A. M.; Inkyu Lee; Communications, 2002. ICC 2002. IEEE International Conference on, Volume: 1, 28 Apr.-2 May 2002 Pages: 460-464

A method of reducing a calculation amount is also shown in FIG. 1 of this Document 2. However, this search algorithm is also a tree search algorithm, and hence the same tendency as described above exists.

As described above, in the conventional wireless communication receiving devices, the processing time of the decoding operation has a tendency to become unable to be made constant.

BRIEF SUMMARY OF THE INVENTION

A wireless communication receiving device according to one aspect of the present invention comprises: an initializing section for obtaining a temporary solution from a transmission route estimation value and a reception signal; a solution candidate calculating section for obtaining a solution candidate for each dimension existing inside a search area around the temporary solution; a solution candidate selecting section for deleting a solution candidate a cumulative distance of which is large when the number of solution candidates exceeds a specified resource number; a distance calculating section for obtaining a partial distance between the temporary solution and the solution candidate for each dimension, and a cumulative distance of the obtained partial distances; and a distance comparing section for comparing the sizes of the cumulative distances with each other, obtaining a solution candidate having a smaller cumulative distance, and controlling the solution candidate calculating section, the solution candidate selecting section, and the distance calculating section so as to cause the solution candidate calculating section, the solution candidate selecting section, and the distance calculating section to obtain the solution candidate, delete the solution candidate, and obtain the cumulative distance for each dimension number of the lattice code.

A wireless communication system according to another aspect of the present invention comprises: a transmitting device for transmitting data; and a receiving device for receiving the transmitted data, wherein the receiving device comprises an initializing section for obtaining a temporary solution from a transmission route estimation value and a reception signal; a solution candidate calculating section for obtaining a solution candidate for each dimension existing inside a search area around the temporary solution; a solution candidate selecting section for deleting a solution candidate a cumulative distance of which is large when the number of solution candidates exceeds a specified resource number; a distance calculating section for obtaining a partial distance between the temporary solution and the solution candidate for each dimension, and a cumulative distance of the obtained partial distances; and a distance comparing section for comparing the sizes of the cumulative distances with each other, obtaining a solution candidate having a smaller cumulative distance, and controlling the solution candidate calculating section, the solution candidate selecting section, and the distance calculating section so as to cause the solution candidate calculating section, the solution candidate selecting section, and the distance calculating section to obtain the solution candidate, delete the solution candidate, and obtain the cumulative distance for each dimension number of the lattice code.

BRIEF DESCRIPTION OF THE SEVERAL VIEWS OF THE DRAWING

FIG. 12 is a block diagram showing an SDM decoder according to a comparative example; and FIG. 13 is a flow diagram showing a decoding operation of the SDM decoder according to the comparative example.

DETAILED DESCRIPTION OF THE INVENTION

Embodiments of the present invention will be described below with reference to the accompanying drawings. Incidentally, in the description, the parts common to all the drawings are denoted by common reference symbols.

First Embodiment

Figure 1:
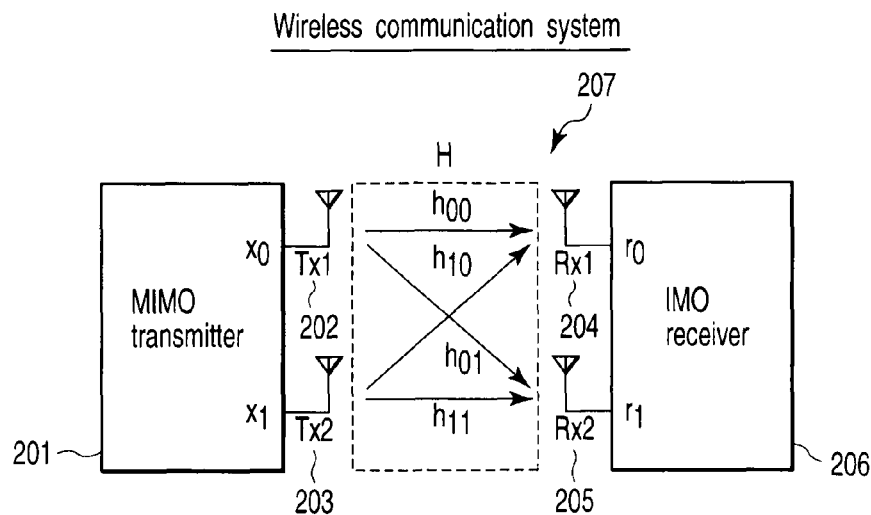
FIG. 1 is a view showing a wireless communication system according to a first embodiment of the present invention.

A wireless communication receiving device according to a first embodiment of the present invention will be described below with reference to FIGS. 1 to 3.

<1. Wireless Communication System>

First, a wireless communication system according to this embodiment will be described below by using FIG. 1. As shown in FIG. 1, the wireless communication system according to this embodiment is provided with a transmitter (transmitting device) 201 of a lattice code (MIMO) by a communication equipment using space division multiplexing and a (MIMO) receiver (receiving device) 206.

The transmitter (transmitting device) 201 is provided with two transmitting antennas Tx1(202) and Tx2(203), and is configured to transmit transmission data from the transmitting antennas Tx1(202) and Tx2(203) to the receiver 206. Each of the transmitting antennas Tx1(202) and Tx2(203) transmits an independent signal x0 or x1.

The receiver (receiving device) 206 is provided with two receiving antennas Rx1(204) and Rx2(205), and is configured to decode a received data into predetermined transmission data. Each of the receiving antennas Rx1(204) and Rx2(205) receives a signal r0 or a signal r1.

Here, in the case of this embodiment, the channel H(207) between the transmitter 201 and the receiver 206 is constituted of four routes h00, h10, h01, and h11 connecting the antennas Tx1(202), Tx2(203), Rx1(204), and Rx2(205).

Next, a configuration example of each of the transmitter 201 and the receiver 206 will be described below with reference to FIG. 2.

Figure 2:
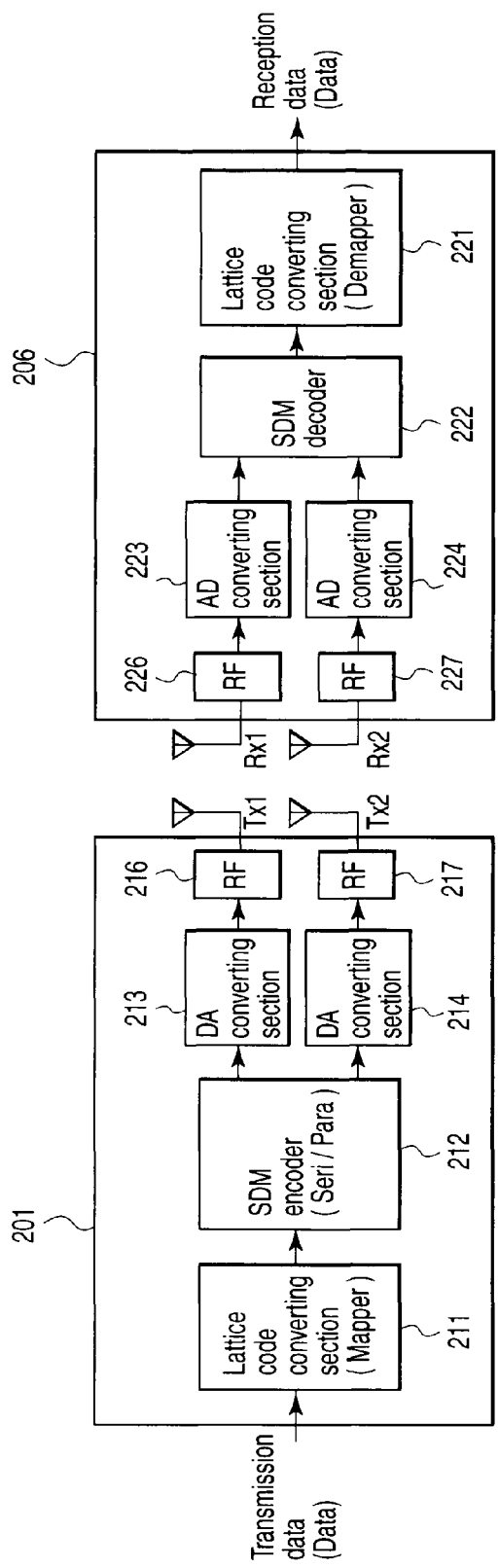
FIG. 2 is a block diagram showing a transmitter and a receiver according to the first embodiment.

As shown in FIG. 2, the transmitter 201 is provided with a lattice code converting section (mapper) 211, an SDM encoder 212, DA (digital analog) converting sections 213 and 214, and RFs (radio frequency) 216 and 217.

The lattice code converting section (mapper) 211 is configured to convert input transmission data (data) into a predetermined lattice code.

The SDM encoder 212 is configured to distribute input lattice codes (mapper outputs) to the DA converting sections 213 and 214 in order to transmit input lattice codes from the two (in this embodiment) transmitting antennas Tx1(202) and Tx2(203). For example, the SDM encoder 212 sorts the input lattice codes into two parts by subjecting the input lattice codes to serial/parallel conversion.

Each of the DA (digital analog) converting sections 213 and 214 is configured to convert a lattice code input thereto from the SDM encoder 212 as a digital signal into an analog signal, and output the analog signal to the RF 216 or 217.

Each of the RFs 216 and 217 is configured to convert an analog signal input thereto into a radio signal of a predetermined frequency, and output the radio signal to the transmitting antennas Tx1(202) or Tx2(203). For example, in the case of this embodiment, the RFs 216 and 217 each convert an input analog signal into a radio signal of the 2.4 GHz band.

The receiver 206 is provided with a lattice code converting section (demapper) 221, an SDM decoder 222, AD (analog digital) converting sections 223 and 224, and RFs 226 and 227.

Each of the RFs 226 and 227 is configured to convert a radio signal of a predetermined frequency input thereto from the receiving antenna Rx1(204) or Rx2(205) into an analog signal, and output the analog signal to the AD converting section 223 or 224.

Each of the AD (analog digital) converting sections 223 and 224 is configured to convert the analog signal input thereto into a predetermined digital signal, and output the digital signal to the SDM decoder 222.

The SDM decoder 222 is configured to decode a lattice code which is a digital signal input thereto from the AD converting section 223 or 224 into a signal (lattice code) before being subjected to interference, and output the decoded signal to the lattice code converting section (demapper) 221.

The lattice code converting section (demapper) 221 is configured to convert the lattice code input thereto from the SDM decoder 222 into transmission data (data), and output the data as reception data (data).

<2. Configuration Example of SDM Decoder>

Next, a configuration example of an SDM decoder (sphere decoder) according to this embodiment will be described below with reference to FIG. 3.

Figure 3:
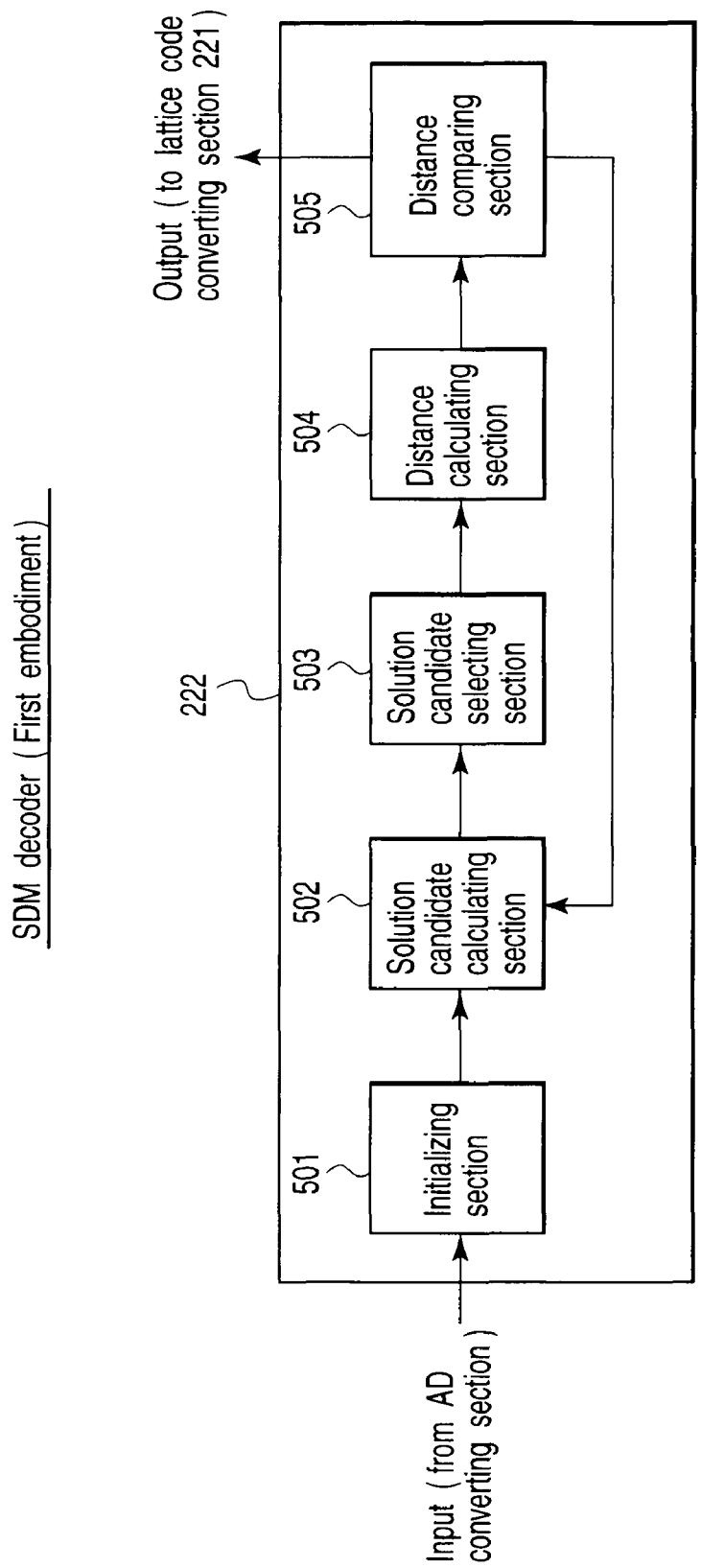
FIG. 3 is a block diagram showing a SDC decoder (sphere decoder) according to the first embodiment.

As shown in FIG. 3, the SDM decoder 222 according to this embodiment is provided with an initializing section 501, a solution candidate calculating section 502, a solution candidate selecting section 503, a distance calculating section 504, and a distance comparing section 505.

The initializing section 501 is configured to perform obtaining a temporary solution (first step ST1 to be described later) from a transmission route estimation value (H) and a reception signal (R: lattice code).

The solution candidate calculating section 502 is configured to perform obtaining a solution candidate for each dimension existing inside a search area around the temporary solution (second step ST2 to be described later).

The solution candidate selecting section 503 is configured to, when the number of solution candidates exceeds a specified resource number (MAX), perform deleting a solution candidate having a large cumulative distance (fourth step ST4 to be described later).

The distance calculating section 504 is configured to perform obtaining a partial distance between the temporary solution and the solution candidate for each dimension, and a cumulative distance (Dist [i]) of the obtained partial distance $(U^2_{k,k}(X[i]-<X>'[i])^2$; here, $<X>$; X is written as X hat) (third step ST3 to be described later).

The distance comparing section 505 is configured to compare the cumulative distances and obtain a solution candidate having a smaller cumulative distance (fifth step ST5 to be described later). Further, the distance comparing section 505 controls the solution candidate calculating section 502, solution candidate selecting section 503, and distance calculating section 504 so as to cause them to perform the second to fourth steps ST2 to ST4 for each dimension number of the lattice code after step ST5.

<3. Wireless Communication Operation>

Next, a wireless communication operation in the transmitter 201 and the receiver 206 according to this embodiment will be described below with reference to FIG. 4.

Figure 4:
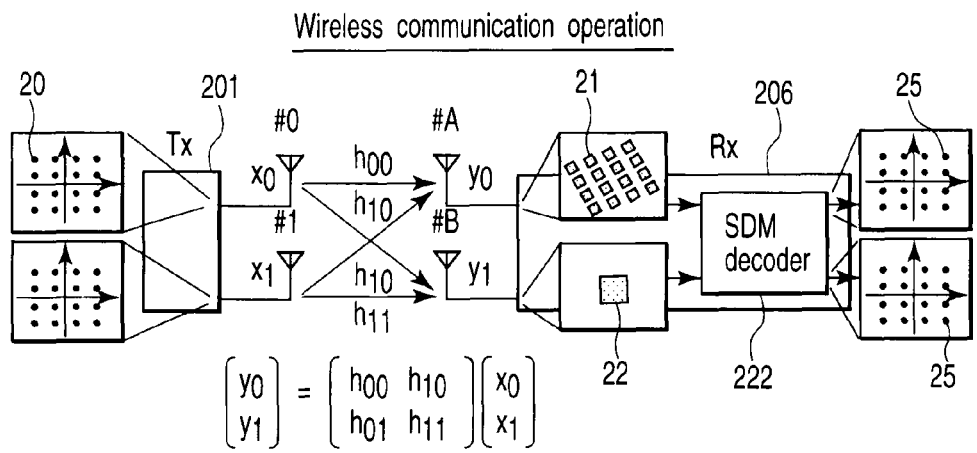
FIG. 4 is a block diagram for explaining a wireless communication operation according to the first embodiment.

As shown in FIG. 4, the channel H(207) between the transmitter 201 and the receiver 206 is constituted of four routes h00, h10, h01, and h11 connecting the antennas Tx1(202), Tx2(203), Rx1(204), and Rx2(205).

As a result, a lattice signal received by each of the receiving antennas Rx1 and Rx2 is interfered with the respective routes. For example, as shown in FIG. 4, the lattice code 21 received by the receiving antenna Rx1 is a lattice code after being subjected to interference from the routes h00 and h01. For example, the lattice code 22 received by the receiving antenna Rx2 is a lattice code after being subjected to interference from the routes h10 and h11.

Therefore, the SDM decoder 222 is required to decode the lattice codes 21 and 22 which are input digital signals into lattice codes before being subjected to interference, and output the decoded lattice codes to the lattice code converting section (demapper) 221.

<4. Decoding Operation of Lattice Code>

A decoding operation of the SDM decoder 222 for decoding the input lattice codes 21 and 22 according to this embodiment will be described below with reference to FIGS. 5 to 9.

<4-1. Assumption of Decoding Operation>

First, maximum likelihood determination for obtaining maximum likelihood solutions of the lattice codes 21 and 22 will be described below as an assumption of the decoding operation.

A lattice code S can be defined as shown by the following (formula 1) by using the number of dimensions.

$$S \in D^Q \quad \text{(formula 1)}$$

Subsequently, D can be defined as shown by the following (formula 2) according to the modulation scheme.

$$\text{4-QAM}: D \in \{-1,+1\}, S \in D^2$$

$$\text{16-QAM}: D \in \{-3,-1,+1,+3\}, S \in D^2 \quad \text{(formula 2)}$$

Figure 5:
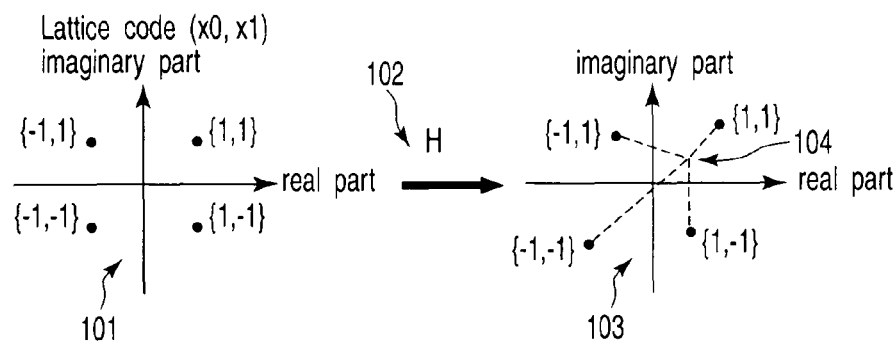
FIG. 5 is a view for explaining a lattice code according to the first embodiment.

Here, as shown in FIG. 5, the state of transmission/reception of the lattice code on the transmission side 101 and the reception side 103 is shown. In FIG. 5, the case where a lattice code obtained by modulating 2-bit information {x0, x1} by means of 4-QAM (lattice number: 4) is transmitted is shown as an example. As shown in FIG. 5, on the transmission side, a lattice is formed by allocating x0 to the real number component, and allocating x1 to the imaginary number component. In this case, the lattice code S is represented by the following (formula 3).

$$S \in D^2, D \in \{-1,+1\} \quad \text{(formula 3)}$$

The transmission signal is received in a distorted form due to the channel H(102). Hence, the reception signal R is represented by the following (formula 4) by using a noise component n.

$$r = Hx + n \quad \text{(formula 4)}$$

Here, as shown in FIG. 2 and the like, the transmitter 201 and the receiver 206 of the lattice code by the space division multiplex system are provided with two transmitting antennas Tx1(202) and Tx2(203), and two receiving antennas Rx1(204) and Rx2(205), respectively. At this time, the channel H(207) is constituted of four routes connecting the respective antennas. The independent signals x0 and x1 are transmitted from the respective transmitting antennas, and the signals r0 and r1 are received at the receiver (206) by the respective antennas.

In this case, the above (formula 4) can be expanded as follows by using a matrix.

$$R = HX + N \quad \text{(formula 5)}$$

$$\begin{pmatrix} r_0 \\ r_1 \end{pmatrix} = \begin{pmatrix} h_{00} & h_{01} \\ h_{10} & h_{11} \end{pmatrix} \begin{pmatrix} x_0 \\ x_1 \end{pmatrix} + \begin{pmatrix} n_0 \\ n_1 \end{pmatrix}$$

However, it is assumed that the following (formula 6) is to be satisfied.

$$\{x_1, x_2\} \in D^Q \quad \text{(formula 6)}$$

Subsequently, assuming that the number of antennas is m, the lattice code can be defined as follows by the following (formula 7).

$$S \in D^{Q \times m} \quad \text{(formula 7)}$$

According to the above (formula 7), it is meant that only the dimension is expanded and the essence of the lattice code has not been changed at all.

In this example, decoding of a lattice code by the space division multiplex system will be described below. However, not only the space division multiplex system but also other general decoding of a lattice code can also be employed.

Subsequently, on the receiver 206 side, X is decoded by using the reception signal R and the channel information H. As the decoding algorithm, ZF (zero-forcing), V-BLAST, maximum likelihood decode (MLD), and the like are known. In this example, description will be given by taking maximum likelihood decode (MLD) as an example.

The maximum likelihood decode (MLD) is a decoding algorithm in which when noise is zero, a reception constellation pattern of the lattice code is created as a replica signal, a square error of each replica signal and a reception signal point is calculated, and a replica signal which minimizes the square error is output as a transmission signal.

In other words, the transmission signal is estimated by solving the following (formula 8).

$$\hat{x}_{ML} = \underset{x \in S}{\operatorname{argmin}} \|r - Hx\|^2 \qquad \text{(formula 8)}$$

The point (104) on the reception side 103 shown in FIG. 5 is the reception point. First, what are obtained by multiplying four patterns of the transmission signal {1, 1}, {−1, 1}, {1, −1}, and {−1, −1} by the channel H(102) are created as replica signals.

Subsequently, distances between the reception point (104) and the replica signals are obtained, and a replica signal that minimizes the distance is selected. In this example, the distance between the reception point (104) and the replica signal {1, 1} is the minimum distance.

Subsequently, symbols are defined as follows.

$X^T, X^*$ . . . complex transposed matrix of X $X^\dagger$ . . . Moore-Penrose pseudo-inverse matrix of X The SDM decoder 222 performs a tree search algorithm for estimating a transmission signal x by setting a reception signal r as an input, and using the channel information H. Here, the reception signal r is given by the following (formula 9).

$$r = Hx + n \qquad \text{(formula 9)}$$

Further, the transmission signal X is a lattice code restricted by the (formula 1).

The maximum likelihood determination is given from the (formula 8) by the following (formula 10).

$$\hat{x}_{ML} = \underset{x \in S}{\operatorname{argmin}} \|r - Hx\|^2 \qquad \text{(formula 10)}$$
$$= \underset{x \in S}{\operatorname{argmin}} (x - \tilde{x})^* H^* H (x - \tilde{x})$$

Here, <x> is a zero-forcing solution, and is given by the following.

$$\tilde{x} = H^\dagger r \qquad \text{(formula 11)}$$
$$= (H^T H)^{-1} H^T r$$

A lattice point positioned inside a sphere having a radius d is defined as follows by the following (formula 12).

$$d^2 \geq \|r - H\hat{x}\|^2 = (x - \hat{x})^* H^* H (x - \hat{x}) \qquad \text{(formula 12)}$$

Then, the matrix H·X·H in the (formula 11) is noticed. The matrix H·X·H can be resolved into triangular matrices by Cholesky decomposition (H·X·H=U·X·U). Here, the matrix U is an upper triangular matrix, and is represented by the following (formula 13).

$$U = \begin{bmatrix} u_{1,1} & u_{1,2} & u_{1,3} & \cdots & u_{1,m} \\ 0 & u_{2,2} & u_{2,3} & \cdots & u_{2,m} \\ 0 & 0 & u_{3,3} & \cdots & u_{3,m} \\ 0 & 0 & \vdots & \ddots & \vdots \\ 0 & 0 & 0 & 0 & u_{n,m} \end{bmatrix} \qquad \text{(formula 13)}$$

Accordingly, the above (formula 12) can be represented as follows by the (formula 14) below.

$$d^2 \geq (x - \hat{x})^* H^* H (x - \hat{x}) \qquad \text{(formula 14)}$$
$$= (x - \hat{x})^* U^* U (x - \hat{x})$$
$$= \sum_{k=1}^{Q} u_{k,k}^2 \left( (x_k - \hat{x}_k) + \sum_{j=k+1}^{Q} \frac{u_{k,j}^2}{u_{k,k}^2} (x_j - \hat{x}_j) \right)^2$$
$$= u_{Q,Q}^2 (x_Q - \hat{x}_Q)^2 + u_{Q-1,Q-1}^2 \left( x_{Q-1} - \hat{x}_{Q-1} + \frac{u_{Q-1,Q}^2}{u_{Q-1,Q-1}^2} (x_Q - \hat{x}_Q) \right)^2 + \ldots$$

Here, the initial term $u^2_{Q,Q}(x_Q - \langle x \rangle_Q)^2$ is a term dependent on only $x_Q$. Hence, only $x_Q$ is evaluated by the following (formula 15).

$$u_{Q,Q}^2 (x_Q - \hat{x}_Q)^2 \leq d^2 \qquad \text{(formula 15)}$$

That is the evaluation is shown by the following (formula 16).

$$\left[ \hat{x}_Q - \frac{d}{u_{Q,Q}} \right] \leq x_Q \leq \left[ \hat{x}_Q + \frac{d}{u_{Q,Q}} \right] \qquad \text{(formula 16)}$$

A solution candidate $x_Q$ satisfying the above (formula 16) is a lattice point positioned inside the sphere having the radius d.

Solution candidates $x_Q$ satisfying the (formula 16) are repeatedly searched for. At this time, the sphere radius is updated as shown by the following (formula 17).

$$d_{Q-1}^2 = d^2 - u_{Q,Q}^2 (x_Q - \hat{x}_Q)^2 \qquad \text{(formula 17)}$$

Subsequently, paying attention to the second term of the (formula 14), the second term is a term dependent on $x_Q$ and $x_{Q-1}$, and hence, if $x_Q$ is made definite, the second term becomes a term dependent only on $x_{Q-1}$. Thus, only $x_{Q-1}$ is evaluated by the following (formula 18).

$$u_{Q-1,Q-1}^2 \left( x_{Q-1} - \hat{x}_{Q-1} + \frac{u_{Q-1,Q}^2}{u_{Q-1,Q-1}^2} (x_Q - \hat{x}_Q) \right)^2 \leq d_{Q-1}^2 \qquad \text{(formula 18)}$$

Accordingly, a solution candidate $x_{Q-1}$ satisfying the following (formula 19) is a lattice point positioned inside a sphere having a radius $d_{Q-1}$.

$$\left[ \hat{x}_{Q-1|Q} - \frac{d_{Q-1}}{u_{Q-1,Q-1}} \right] \leq x_{Q-1} \leq \left[ \hat{x}_{Q-1|Q} + \frac{d_{Q-1}}{u_{Q-1,Q-1}} \right] \qquad \text{(formula 19)}$$

The same calculation is performed for all the solution candidates $x_{Q-2}, x_{Q-3}, \ldots, x_1$.

Subsequently, when a solution candidate <x>'=($x_{Q-2}, x_{Q-3}, \ldots, x_1$) satisfying the above (formula 14) is found, the sphere radius is updated by using a distance <<r−H<x>'>>$^2$ between the solution candidate <x>' and the reception point r.

$$d'^2 = \|r - H\hat{x}'\|^2 \qquad \text{(formula 20)}$$

Subsequently, the new sphere radius $d'^2$ is used to search for a solution candidate satisfying the above (formula 14) again. Finally, a solution found when only one solution exists in the sphere radius is the maximum likelihood solution.

<4-2. Decoding Operation of SDM Decoder According to this Example>

Figure 6:
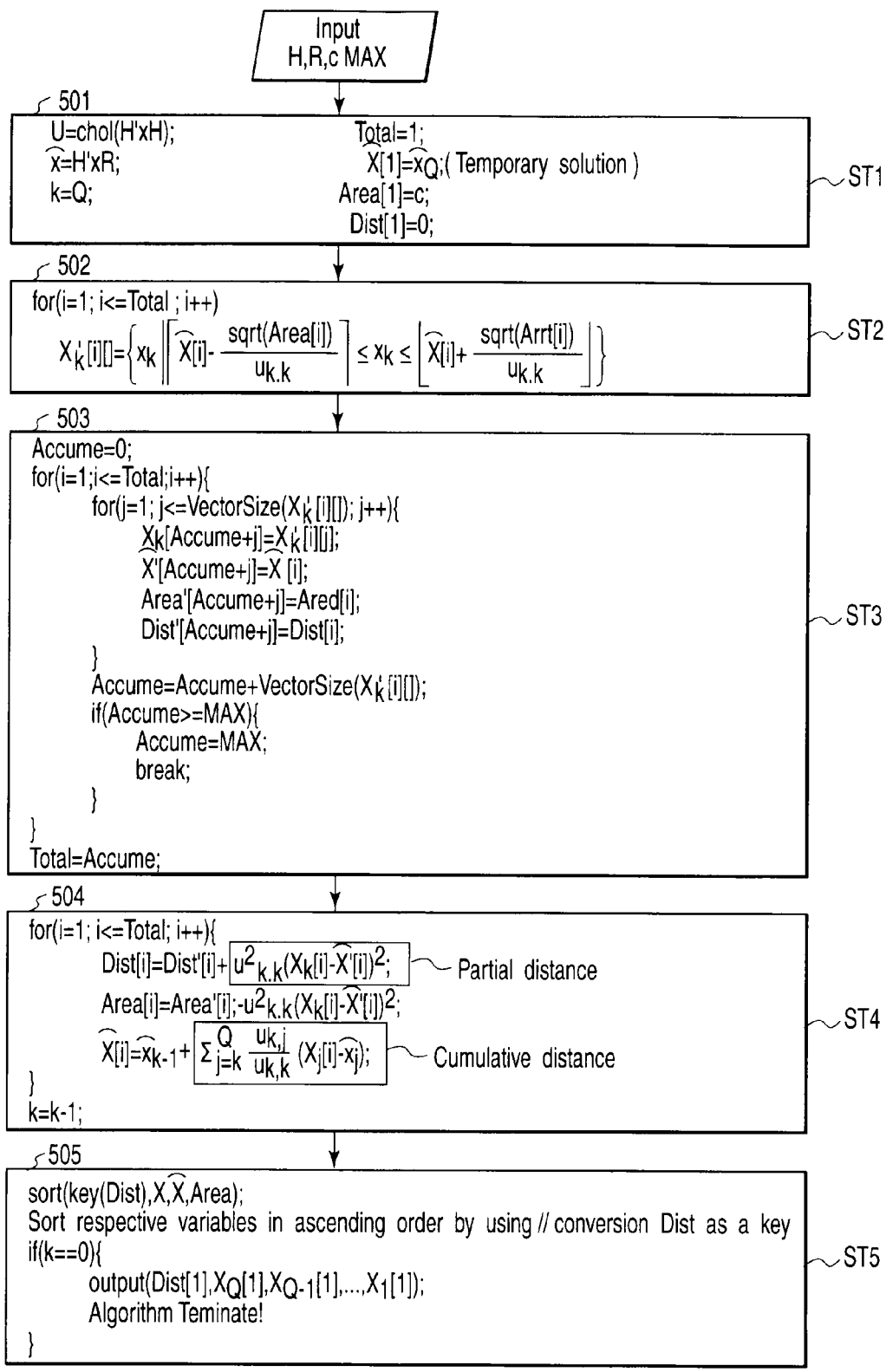
FIG. 6 is a flow diagram showing a decoding operation of a lattice code of a receiver according to the first embodiment.

Next, setting the description of <4-1> as an assumption, a decoding operation of the SDM decoder 222 according to this example will be described below. In this description, description will be given on the basis of the flow shown in FIG. 6. In FIG. 6, concrete processing of each part is shown by a pseudocode.

(Step ST1 (Initialization of Variable))

First, H: channel information (transmission route estimation value), R: reception signal, c: search area, MAX: resource maximum number (at most resource number) are input to the initializing section 501 as an input.

Subsequently, the initializing section 501 initializes the respective input variables, and performs the first step of obtaining a temporary solution (solution <X>[1] initialized by a value <$x_O$> of the zero-forcing solution) from the input transmission route estimation value (channel information) H and the reception signal.

More specifically, the initializing section 501 executes initialization and calculation of the following seven points. Here, [ ] represents arrangement.

U: calculating Cholesky decomposition of channel information H
<x>: calculating zero-forcing solution
k: initializing by using dimension number Q of lattice code
Total: initializing solution candidate by using 1
Temporary solution <X>[1]: initializing by using value <$x_O$> of zero-forcing solution
Area [1]: initializing by using search area c which is input
Dist [1]: initializing cumulative distance by using 0

(Step ST2 (Solution Candidate Calculation))

Subsequently, the solution candidate calculating section 502 performs the second step of obtaining a solution candidate <X>' [i] [ ] for each dimension existing inside the search area around a temporary solution (solution <X>[1] initialized by using a value <$x_O$> of the zero-forcing solution).

More specifically, the solution candidate calculating section 502 obtains a solution candidate point existing in the search area centering on <X> [i] in the dimension (suffix k) to which attention is currently paid. Further, all the solution candidate points <X>' [i] [ ] are stored so as to be arranged as variables. The above processing is executed for all the solution candidates (suffix i).

(Step ST3)

Subsequently, when the number of the above solution candidates <X>' [i] [ ] exceeds a specified resource number MAX, the solution selecting section 503 performs the third step of deleting a solution candidate <X>' [i] [ ] having a large cumulative distance Dist [i].

By repeating the processing of the solution candidate calculating section 502 and the distance calculating section 504 to be described later (second step ST2 and fourth step ST4) the dimension number (Q) of times, distances between all the solution candidates existing in the initially given search area and the reception point can be formally calculated. However, with an increase in the number of solution candidates existing in the search area, the calculation amount also increases.

Thus, when the number of solution candidates which are objects of operation exceeds the resource number MAX, the solution candidate selecting section 503 deletes a solution candidate a cumulative distance Dist [i] of which is large so as to reduce the number of operation objects.

As described above, the solution candidate selecting section 503 preferentially leaves operation objects each having a small cumulative distance (Dist [i]) unerased so that solution candidates closer to the maximum likelihood solution can be held.

Here, it can be said that the maximum likelihood solution is a "combination of solution candidates that minimizes a distance between the reception signal and the solution candidate". This is because it can be said that in the course of an operation, a solution candidate a cumulative distance (Dist [i]) of which is the smallest is the partial solution closest to the maximum likelihood solution.

(Step ST4)

Subsequently, the distance calculating section 503 performs the third step of obtaining a partial distance between the temporary solution <X> [1] and the solution candidate <X>' [i] [ ] for each dimension, and a cumulative distance of the obtained partial distance.

More specifically, the distance calculating section 503 calculates the partial distance $(U^2_{k,k}(X[i]-<X>'[i])^2$ in the dimension (suffix k) to which attention is currently paid, and updates the cumulative distance Dist [i].

At the same time, by subtracting the partial distance from the search area at that time, the search area Area [i] is updated. Further, <X> [i] is also updated as preliminary preparation for performing processing of the next dimension.

The above processing is executed for all the solution candidates (suffix i). For example, after the processing of the step ST3 in the dimension of 1 is completed, the number of the dimension (suffix k) is reduced by one, and the processing of the next dimension is performed.

(Step ST5)

Subsequently, the distance comparing section 505 compares the sizes of the cumulative distances Dist [i] with each other, and obtains a solution candidate <X>' [i] [ ] a cumulative distance Dist [i] of which is small. Thereafter, the distance comparing section 505 controls the solution candidate calculating section 502, solution candidate selecting section 503, and distance calculating section 504 so as to cause them to perform the second to fourth steps ST2 to ST4 for each dimension number of the lattice code.

That is, after the step ST4 is completed by the distance calculating section 504, the distance comparing section 505 compares the sizes of the cumulative distances Dist [i] with each other, and rearranges the solution candidates (suffix i) in such a manner that their cumulative distances (Dist [i]) are in an ascending order. As a result, a solution candidate having a smaller suffix i is a solution candidate closer to the maximum likelihood solution.

Again, the solution candidate calculating section 502 obtains a solution candidate by the similar step ST2.

Subsequently, the solution candidate selecting section 603 selects solution candidates preferentially from the one having the smaller suffix i. When the number of solution candidates exceeds the resource number (MAX), deletion of the solution candidates is performed.

Subsequently, the distance comparing section 505 compares the sizes of the cumulative distances Dist [i] with each other, and obtains a solution candidate <X>' [i] [ ] a cumulative distance Dist [i] of which is small.

Finally, the distance comparing section 505 outputs the solution candidate <X>' [i] [ ] to the lattice code converting section (demapper) 221 as a decoded lattice code.

The above first to fifth steps ST1 to ST5 are repeated the dimension number (Q) of times, and the decoding operation of the SDM decoder of this example is terminated.

As described above, when the number of the solution candidate <X>' [i] [ ] exceeds the specified resource number MAX at the time of the step ST3, the solution candidate selecting section 503 performs the third step of deleting a solution candidate <X>' [i] [ ] a cumulative distance Dist [i] of which is large.

As a result, it is possible to keep the number of solution candidate <X>' [i] [ ] within a predetermined resource number MAX independent of the number of solution candidates <X>' [i] [ ] existing in the search area, and make the processing time constant.

Incidentally, the at most resource number MAX can be arbitrarily determined as the need arises. For example, definition of the resources such as "data storage number", "number of operations for performing distance calculation", "number proportional to processing time", and the like, can be arbitrarily determined. Incidentally, when the number of resources is made small, the decoding performance is deteriorated. According to the experiment, it is known that if the resource number 16 (MAX=16) is secured, it is possible to deal with the 2×2MIMO space division multiplexing system of 64QAM.

<Decoding Performance>

The decoding performance of the SDM decoder according to this example will be described below with reference to FIGS. 7 and 8.

Figure 7:
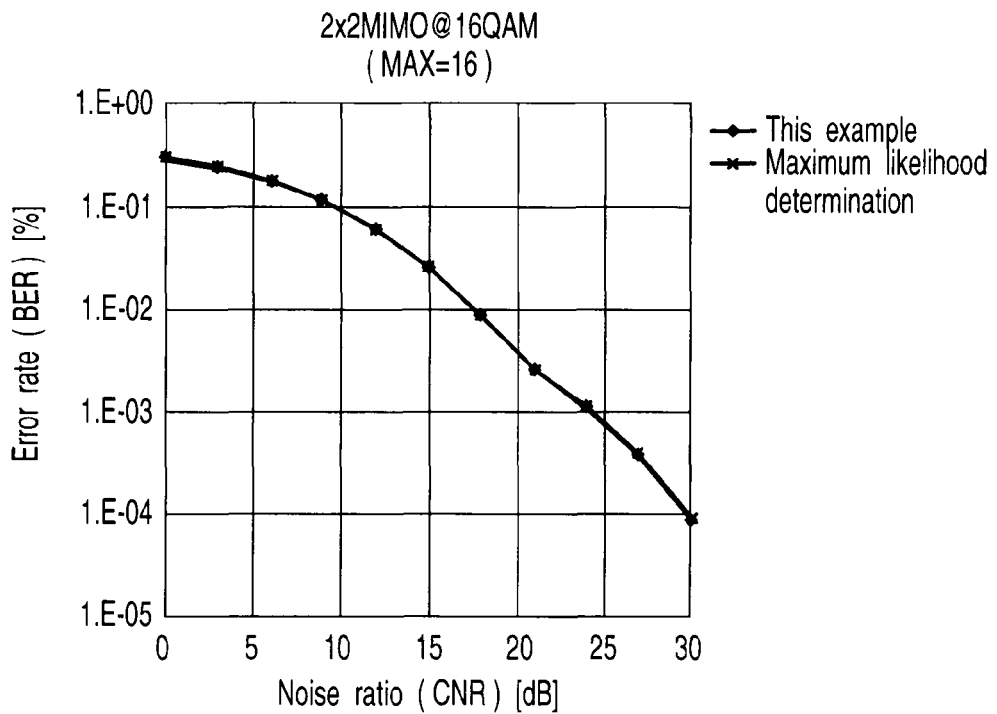
FIG. 7 is a graph showing a relationship between a noise ratio (CNR) [dB] and an error rate (BER) [%] in the case where the number of lattices is 16 (16 QAM signal)

FIG. 7 is a graph showing a relationship between noise ratio (CNR) [dB] and error rate (BER) [%] in the case of the lattice number 16 (16QAM signal). FIG. 8 is a graph showing a relationship between noise ratio (CNR) [dB] and error rate (BER) [%] in the case of the lattice number 64 (64QAM signal). In each of the cases shown in FIGS. 7 and 8, the resource number is made to be 16 (MAX=16). The maximum likelihood determination which is the comparison object is an ideal value in the case where the total solution search is used.

Figure 8:
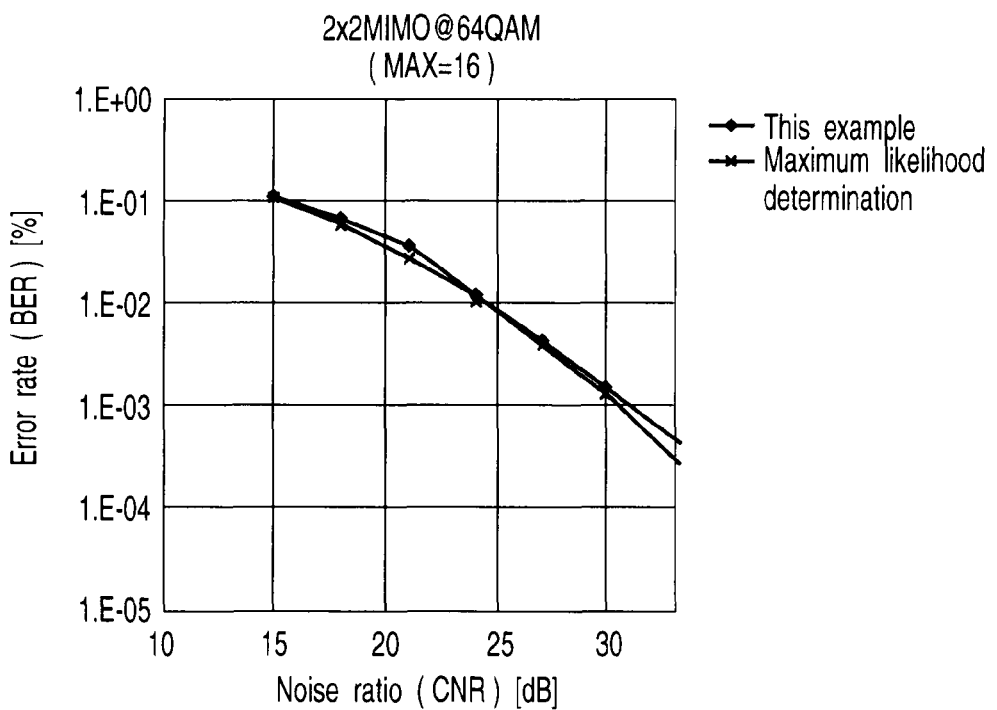
FIG. 8 is a graph showing a relationship between a noise ratio (CNR) [dB] and an error rate (BER) [%] in the case where the number of lattices is 64 (16 QAM signal)

As shown in FIGS. 7 and 8, in each of the cases, the decoding can be achieved within a CNR degradation amount of 1 dB as compared with the ideal curve of maximum likelihood determination.

<5. Advantage According to this Embodiment>

According to the wireless communication receiving device and the wireless communication system related to this embodiment, at least the following advantages (1) to (3) can be obtained.

(1) The processing time of the decoding operation can be made constant.

As described above, the receiver (receiving device) 206 according to this example is provided with a solution candidate selecting section 503 for performing the third step (ST3) of deleting a solution candidate <X>' [i] [ ] when the number of the solution candidates <X>' [i] [ ] exceeds a specified resource number MAX.

Figure 9:
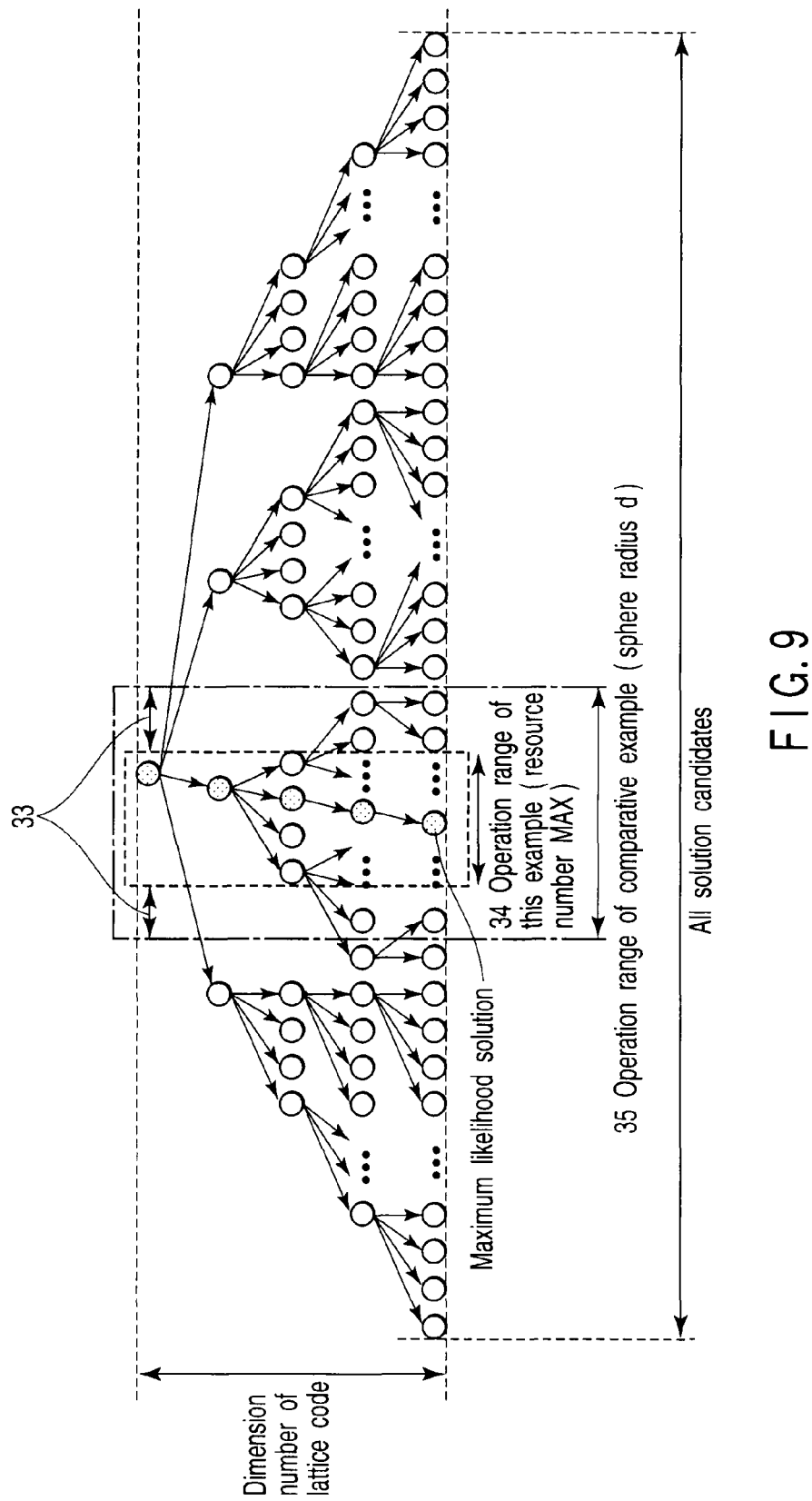
FIG. 9 is a view showing the case where a decoding operation of a receiver according to a comparative example and a decoding operation of a receiver according to the first embodiment are compared with each other.

As a result, it is possible to keep the number of solution candidate <X>' [i] [ ] within a predetermined resource number MAX independent of the number of solution candidates <X>' [i] [ ] existing in the search area as shown in, for example, FIG. 9. This is because when the number of solution candidates <X>' [i] [ ] exceeds the specified resource number MAX at the time of the step ST3, the solution candidate selecting section 503 can delete a solution candidate a cumulative distance of which is large, and can delete the operation ranges 33 in FIG. 9.

As a result, the number of solution candidates in the operation range 34 for obtaining the maximum likelihood solution of the SDM decoder 222 according to this example can be made within the specified resource number MAX even when the number of solution candidates exceeds the specified resource number MAX. On the other hand, the operation range 35 for obtaining the maximum likelihood solution of the decoder according to the comparative example to be described later has a sphere radius d, which is larger than that of this example.

However, FIG. 9 is conceptually shown as an example, and, because of a variation or the like in the resource number MAX, other operation range can be taken. For this reason, for example, the operation range is not limited to the second dimension, and can be the third dimension such as a sphere.

On the other hand, as shown in FIGS. 7 and 8, the decoding performance of the receiver 206 according to this example can obtain a result substantially equal to the ideal curve of maximum likelihood determination. In, for example, each of the cases shown in FIGS. 7 and 8, the decoding can be achieved within a CNR degradation amount of 1 dB as compared with the ideal curve of maximum likelihood determination.

As described above, the solution candidate selecting section 503 performs the third step ST3, and hence the number of solution candidate points that determines an amount of the processing time can be made constant. Accordingly, it is possible to make the processing time of the decoding operation constant while maintaining the decoding performance.

(2) Pipeline processing of the decoding operation can be performed.

Furthermore, the receiver (receiving device) 206 according to this example is provided with the distance comparing section 505 which compares the sizes of the cumulative distances Dist [i] with each other, and obtains a solution candidate <X>' [i] [ ] a cumulative distance Dist [i] of which is small, and controls the solution candidate calculating section 502, solution candidate selecting section 503, and distance calculating section 504 so as to cause them to perform the second to fourth steps ST2 to ST4 for each dimension (Q) number of the lattice code.

As described above, the distance comparing section 505 controls the solution candidate calculating section 502, solution candidate selecting section 503, and distance calculating section 504 so as to cause them to perform the second to fourth steps ST2 to ST4 for each dimension (Q) number of the lattice code. As a result of this, the number of repetition of the second to fourth steps is determined by the dimension number (Q) of the lattice code and be made constant. As a result, after repeating the second to fourth steps the dimension number (Q) of times, the distance comparing section 505 can output a solution candidate <X>' [i] [ ] to the lattice code converting section (demapper) 221 as a decoded lattice code, and can stop the decoding operation.

As described above, the number times of repetition of the second to fourth steps performed by the distance comparing section 505 is determined by the dimension number (Q) of the lattice code, and can be made fixed. As a result, as shown in FIG. 6, a complicated comparison determination step is not required, the throughput of processing can be improved, and the pipeline processing of the decoding operation can be performed.

(3) The wireless communication receiving device and the wireless communication system according to this embodiment are advantageous to reduction of power consumption and reduction of the occupation area.

As shown in (1) and (2) described above, according to the receiving device (receiver) related to this example, throughput of processing can be improved without the need of performing a complicated determination step. As a result, the circuit size can be reduced, and hence the receiving device is advantageous in the point that the power consumption can be reduced, and the occupation area can also be reduced.

Second Embodiment

Another Example of Decoding Operation

Figure 10:
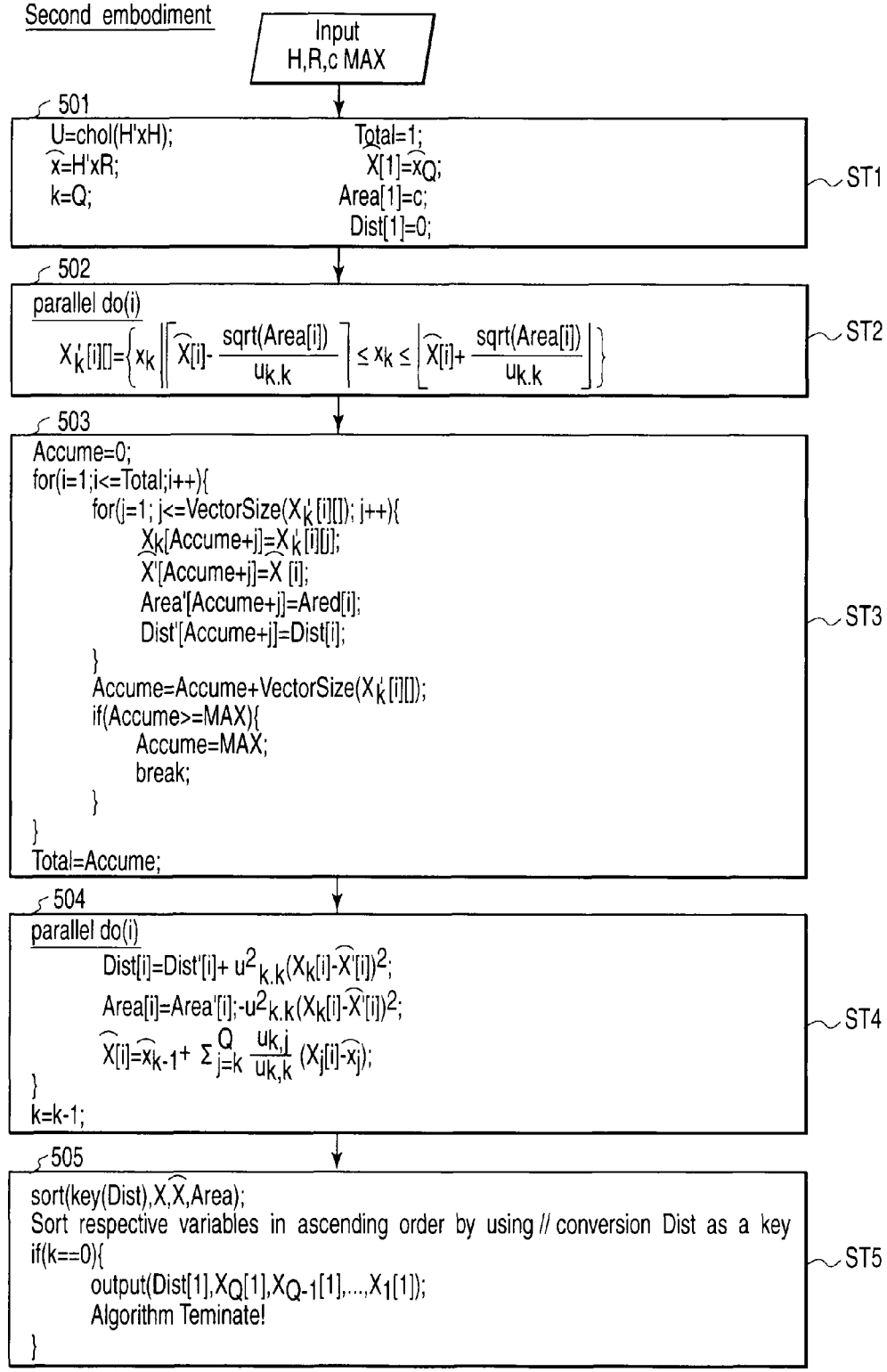
FIG. 10 is a flow diagram showing a decoding operation of a receiver according to a second embodiment.

Next, a wireless communication receiving device and a wireless communication system according to a second embodiment will be described below with reference to FIG. 10. This embodiment relates to another example of the decoding operation. In this description, a detailed description of parts overlap those of the first embodiment is omitted. FIG. 10 is a flow diagram showing a decoding operation according to this embodiment.

As shown in FIG. 10, at the time of the step ST2 or step ST4, the second embodiment differs from the first embodiment in the point that the part executed by a "for sentence" in the first embodiment is replaced with "parallel do (i)" in the second embodiment.

The above executive instruction "parallel do (i)" is an instruction to be processed in parallel with respect to the suffix i. Thus, a solution candidate calculating section 502 and distance calculating section 504 perform calculations independent of the suffix i, and hence there is no need to consider a data dependence relationship or the like, and operations can be performed in parallel with each other in the same dimension number Q (steps ST2 and ST4).

At the time of steps ST2 and ST4, by virtue of parallelization of operations by the executive instruction "parallel do (i)", operations for all the solution candidates can be completed within a time for processing one datum independent of the number of solution candidates. At this time, the necessary and sufficient number of computing units is the resource number (MAX).

Incidentally, it is also possible to reduce the number of operation units by preparing operation units of half the resource number (MAX), and using the operation units twice. The processing time and the number of operation units are determined on the basis the balance corresponding to the needs of system requirements.

As described above, according to this example, the processing time can be kept constant at all times independent of the number of solution candidate points existing in the search area. The processing time is of order (Q) with respect to the dimension number (Q), and if the dimension number Q is constant, the processing time also becomes constant.

As described above, according to the wireless communication receiving device and the wireless communication system related to this embodiment, at least the same advantages as those of (1) and (2) described previously can be obtained.

Furthermore, the SDM decoder according to this example differs from that of the first embodiment in the point that the part executed by a "for sentence" in the first embodiment is replaced with "parallel do (i)" in the second embodiment.

Thus, the solution candidate calculating section 502 and distance calculating section 504 perform calculations independent of the suffix i, and hence there is no need to consider a data dependence relationship or the like, and operations can be performed in parallel with each other in the same dimension number Q (steps ST2 and ST4). As a result, at the time of steps ST2 and ST4, by virtue of parallelization of operations by the executive instruction "parallel do (i)", the second embodiment is advantageous in the point that operations for all the solution candidates can be completed within a time for processing one datum independent of the number of solution candidates.

Third Embodiment

One Example of Architecture

Next, a wireless communication receiving device and a wireless communication system according to a third embodiment will be described below with reference to FIG. 11. This embodiment relates to an example of architecture compatible with decoding of 2×2MIMO space division multiplexing system using QAM modulation. In the description, a detailed description of parts overlap those of the first embodiment is omitted.

Figure 11:
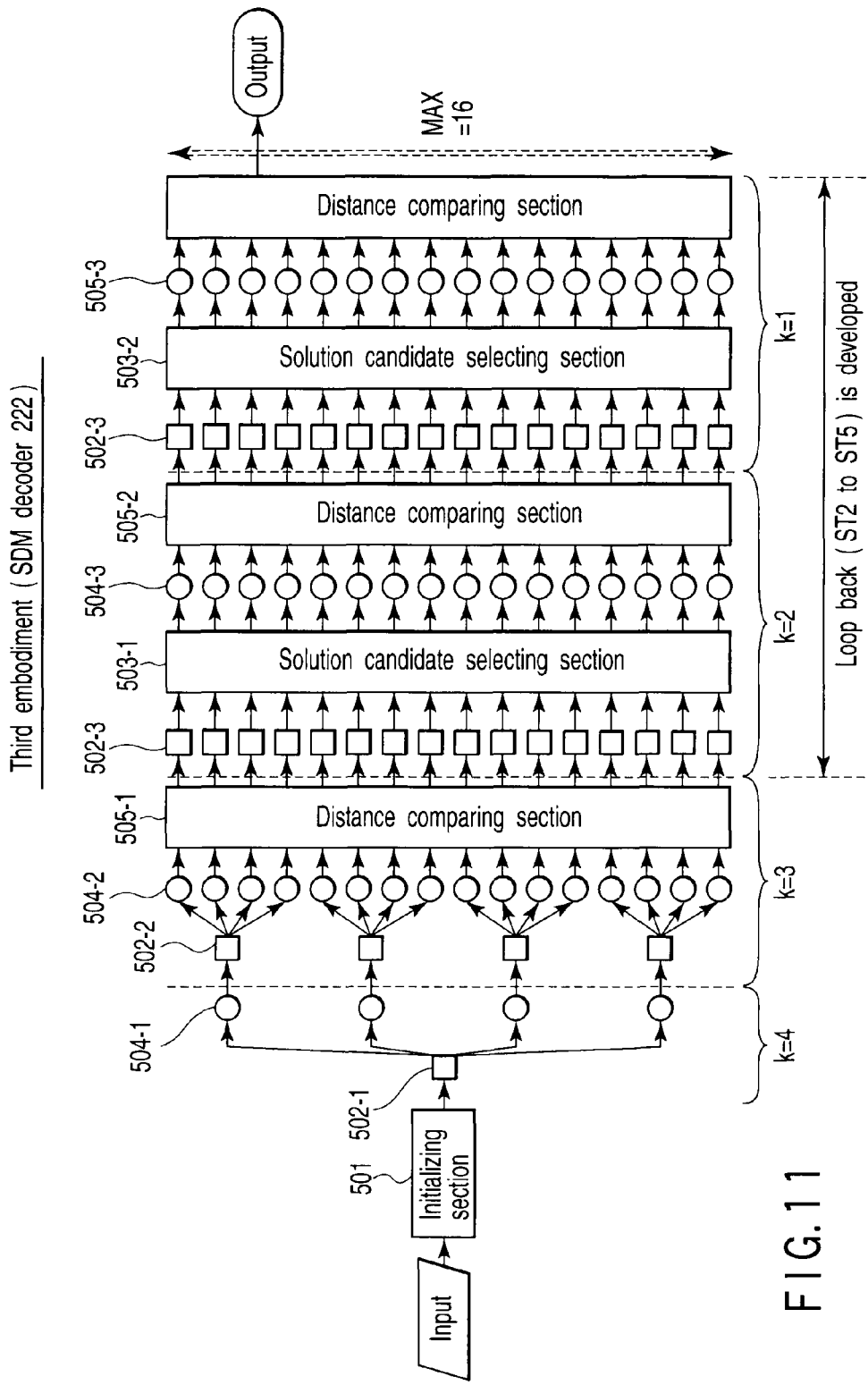
FIG. 11 is a view showing an architecture of a receiver according to a third embodiment.

As shown in FIG. 11, the architecture of an SDM decoder 222 according to this example is compatible with decoding of 2×2MIMO space division multiplexing system using QAM modulation. As shown in FIG. 11, the QAM modulation is transmitted in a duplex manner, and hence the dimension number Q is 2×2=4. In this example, the resource number MAX is 16.

As shown in FIG. 11, the SDM decoder 222 of this example is constituted of, as the architecture, an initializing section 501, solution candidate calculating sections 502-1 to 502-3 (corresponding to "□" in FIG. 11), solution candidate selecting sections 503-1 to 503-2, distance calculating sections 504-1 to 504-4 (corresponding to "○" in FIG. 11), and distance comparing sections 505-1 to 505-3.

Like the second embodiment, the solution candidate calculating sections 502-1 to 502-3, and the distance calculating sections 504-1 to 504-4 are mounted in parallel with each other in the resource number MAX (=16).

As shown in FIG. 11, the SDM decoder 222 according to the third embodiment differs from that of the second embodiment in the point that loopback (steps ST2 to ST5) from the distance comparing sections 505-1 to 505-3 to the solution candidate calculating sections 503-1 to 503-2 is developed. In this example, the dimension number is 4 (k=4), and hence computing units for four stages are developed.

For example, when the dimension number is 4 (k=4), no more than four pieces of solution candidates are calculated in the solution candidate calculating section 504.

Likewise, when the dimension number is 3 (k=3), no more than sixteen pieces of solution candidates are calculated in the solution candidate calculating section 504. Accordingly, there is no need to select the solution candidates. From this fact, when the dimension number is 4 (k=4), the solution candidate selecting section and the distance comparing section can be omitted, and when the dimension number is 3 (k=3), the solution candidate selecting section can be omitted. In other words, it is not always necessary to prepare the solution candidate selecting section and the distance comparing section in all the dimensions. As a result, the circuit area can be further reduced, which is advantageous.

In this example, data always flows from the input side to the output side, and a data dependence relationship does not occur between the respective processing operations. Thus, all the decoding operations can be performed by pipeline processing. As a result, a high throughput of decoding processing can be realized.

Conversely, according to this example, it can be said that even an operation based on a slow clock enables the processing to be completed in time. For example, when a lattice code is input at each cycle of 20 MHz, if a pipeline operation can be performed at 20 MHz, the processing can be performed in time. Considering the case where this is performed by means of a conventional sphere decoder controlled by a CPU, a high frequency of, for example, 500 MHz or 1 GHz is required. From this fact, it can be said that this example is a mounting method suitable for low power consumption.

Furthermore, the resource number (MAX) is 16, and hence sixteen computing units are prepared in parallel with each other. However, when the number of solution candidates existing in the search area is less than sixteen, not all the computing units are used. In this case, by stopping the operations of computing units which are not used by using a gated clock method or the like, further reduction of power consumption can be realized.

As described above, according to the wireless communication receiving device and the wireless communication system according to this embodiment, at least the same advantages as those of (1) to (3) described previously can be obtained.

Furthermore, in the SDM decoder 222 according to this example, loopback (steps ST2 to ST5) from the distance comparing sections 505-1 to 505-3 to the solution candidate calculating sections 503-1 to 503-2 is developed.

Accordingly, data always flows from the input side to the output side, and a data dependence relationship does not occur between the respective processing operations. Thus, all the decoding operations can be performed by pipeline processing. As a result, this embodiment is advantageous in the point that a high throughput of decoding processing can be realized.

Furthermore, according to this example, it can be said that even an operation based on a slow clock enables the processing to be completed in time. For example, when a lattice code is input at each cycle of 20 MHz, if a pipeline operation can be performed at 20 MHz, the processing can be performed in time. Considering the case where this is performed by means of a conventional sphere decoder controlled by a CPU, a high frequency of, for example, 500 MHz or 1 GHz is required. From this fact, it can be said that this example is also a mounting method suitable for low power consumption.

Comparative Example

Next, a wireless communication receiving device according to a comparative example will be described below with reference to FIGS. 12 and 13 in order to compare it with the wireless communication receiving devices according to the first to third embodiments described above.

As shown in FIG. 12, a sphere decoder (SDM decoder) according to the comparative example is provided with an initializing section 401, a solution candidate calculating section 402, a distance calculating section 403, a search area updating section 404, and a control section 405.

The search algorithm of the decoding operation of the sphere decoder (SDM decoder) according to the comparative example is as shown in FIG. 13.

The processing flow of the decoding operation according to the comparative example will be described below.

(Processing 1)

First, an input of the algorithm is performed at chart number 301. Here, H denotes channel information, R denotes a reception signal, and c denotes an initial value of a radius of a search area.

(Processing 2)

Subsequently, initialization is performed at chart number 302. Here, a zero-forcing solution $x_k$ utilized as Cholesky decomposition U of the channel H, and a central point of the solution candidate search is calculated.

(Processing 3)

Subsequently, a variable k operated at chart numbers 303, 307, 310, 313, and 314 corresponds to the dimension number. Further, Q is a dimension number of the lattice code. The search of a solution is started from k=Q, and is performed while decrement/increment of the dimension number is also performed.

(Processing 4)

Subsequently, at chart number 304, a range of the solution candidate points $x_k$ included in the search area is determined around the zero-forcing solution <x>.

(Processing 5)

Subsequently, at chart numbers 305 and 306, solution candidate points $x_k$ within the range are searched for in sequence.

(Processing 6)

Subsequently, at chart number 311, a distance between the reception signal and the solution candidate point is calculated, and the distance is subtracted from the sphere radius.

(Processing 7)

If a solution is found at chart numbers 309 and 312, the solution candidate is saved, and the sphere radius is updated on the basis of the distance between the solution and the reception signal.

By the decoding processing described above, the narrowing down of the solution candidate points is performed while the search area is also being narrowed down, and the maximum likelihood solution is searched for. The solution candidate points is narrowed down until the solution candidate number in the search area finally becomes one, and the remaining solution candidate becomes the maximum likelihood solution.

Here, if the chart numbers of the decoding processing in FIG. 13 and the respective blocks of the SDM decoder in FIG. 12 are compared with each other, the following is shown.

Chart numbers (FIG. 13)⇒Blocks (FIG. 12)
    chart number 302⇒initializing section 401
    chart number 304⇒solution candidate calculating section 402
    chart number 308+311⇒distance calculating section 403
    chart number 312⇒search area updating section 404
    chart numbers other than the above⇒control section 405

As described above, the algorithm is controlled by the control section 405, and the control of the algorithm skips between the solution candidate calculating section 402 and the distance calculating section 403. Further, when it is determined that the condition is satisfied, the search area is updated by the search area updating section 404, and then the processing of the solution candidate calculating section 402 and the distance calculating section 403 is repeated again by the algorithm.

Here, the processing of the solution candidate calculating section 402, the distance calculating section 403, and the search area updating section 404 is repeatedly executed until the maximum likelihood solution is found, and in the worst case, the processing is repeated the lattice code dimension number ($D^{Q \times m}$) of times. For example, when the case of 64QAM and two transmitting antennas is considered, the processing is repeated 4096 times according to calculations. Although the worst case rarely occurs, it is necessary to cope with such a worst case in advance when the device is incorporated in the system. It is disadvantageous to the incorporation of the device in the system that the processing time is not constant.

When the processing time is not fixed, it is necessary to realize the device by using a CPU and dedicated circuits having a high throughput assuming the occurrence of the worst case, but it is disadvantageous in the point that the power consumption and the circuit size are increased. Further, when a CPU and the dedicated circuits having a high throughput are used, control of the CPU and the circuits is complicated, and hence it is also disadvantageous in the point that the circuits and the program become complicated.

On the contrary, according to the SDM decoder (sphere decoder) 222 and the decoding operation thereof related to each of the first to third embodiments, it is possible to make the processing time of the decoding operation constant. As a result, the use of the SDM decoder and the decoding operation is advantageous to hardware incorporation, and is further advantageous in the point that power consumption can be reduced.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A wireless communication receiving device comprising:
   an initializing section for obtaining a temporary solution from a transmission route estimation value and a reception signal;
   a solution candidate calculating section for obtaining a solution candidate for each dimension existing inside a search area around the temporary solution;
   a solution candidate selecting section for deleting a solution candidate a cumulative distance of which is large when the number of solution candidates exceeds a specified resource number;
   a distance calculating section for obtaining a partial distance between the temporary solution and the solution candidate for each dimension, and a cumulative distance of the obtained partial distances; and
   a distance comparing section for comparing the sizes of the cumulative distances with each other, obtaining a solution candidate having a smaller cumulative distance, and controlling the solution candidate calculating section, the solution candidate selecting section, and the distance calculating section so as to cause the solution candidate calculating section, the solution candidate selecting section, and the distance calculating section to obtain the solution candidate, delete the solution candidate, and obtain the cumulative distance for each dimension number of the lattice code.

2. The device according to claim 1, wherein the solution candidate calculating section performs operations of obtaining solution candidates in the same dimension in parallel with each other.

3. The device according to claim 1, wherein the distance calculating section performs operations of obtaining the cumulative distances in the same dimension in parallel with each other.

4. The device according to claim 1, wherein the distance comparing section repeatedly performs an operation of obtaining the temporary solution, obtaining the solution candidate, deleting the solution candidate, and obtaining the cumulative distance, for each dimension number of the lattice code, thereby performing pipeline processing.

5. The device according to claim 1, wherein when the number of solution candidates in a certain dimension is the resource number at most, the solution candidate selecting section deletes the solution candidate calculation of the dimension.

6. The device according to claim 1, further comprising a receiving antenna for receiving data transmitted thereto from outside.

7. The device according to claim 6, further comprising a radio frequency section for converting a radio signal of a frequency used in the communication output thereto from the receiving antenna into an analog signal.

8. The device according to claim 7, further comprising an analog digital converting section for converting the analog signal output thereto from the radio frequency section into a digital signal.

9. The device according to claim 8, further comprising a decoder provided with an initializing section, a solution candidate calculating section, a solution candidate selecting section, a distance calculating section, and a distance comparing section, and is configured to decode SDM code which is a digital signal output thereto from the analog digital converting section into a signal before being multiplexed in channel.

10. The device according to claim 9, further comprising a demapper for converting the signal output thereto from the decoder into transmission data, and outputting the data to the outside.

11. A wireless communication system comprising:
    a transmitting device for transmitting data; and
    a receiving device for receiving the transmitted data, wherein
    the receiving device comprises
    an initializing section for obtaining a temporary solution from a transmission route estimation value and a reception signal;
    a solution candidate calculating section for obtaining a solution candidate for each dimension existing inside a search area around the temporary solution;
    a solution candidate selecting section for deleting a solution candidate a cumulative distance of which is large when the number of solution candidates exceeds a specified resource number;
    a distance calculating section for obtaining a partial distance between the temporary solution and the solution candidate for each dimension, and a cumulative distance of the obtained partial distances; and
    a distance comparing section for comparing the sizes of the cumulative distances with each other, obtaining a solution candidate having a smaller cumulative distance, and controlling the solution candidate calculating section, the solution candidate selecting section, and the distance calculating section so as to cause the solution candidate calculating section, the solution candidate selecting section, and the distance calculating section to obtain the solution candidate, delete the solution candidate, and obtain the cumulative distance for each dimension number of the lattice code.

12. The system according to claim 11, wherein the solution candidate calculating section performs operations of obtaining solution candidates in the same dimension in parallel with each other.

13. The system according to claim 11, wherein the distance calculating section performs operations of obtaining the cumulative distances in the same dimension in parallel with each other.

14. The system according to claim 11, wherein the distance comparing section repeatedly performs an operation of obtaining the temporary solution, obtaining the solution candidate, deleting the solution candidate, and obtaining the cumulative distance, for each dimension number of the lattice code, thereby performing pipeline processing.

15. The system according to claim 11, wherein when the number of solution candidates in a certain dimension is the resource number at most, the solution candidate selecting section deletes the solution candidate calculation of the dimension.

16. The system according to claim 11, wherein
the transmitting device further comprises a mapper for converting a signal input thereto from outside into transmission data, and
the receiving device further comprises a receiving antenna for receiving data transmitted thereto from outside.

17. The system according to claim 16, wherein
the transmitting device further comprises an encoder for distributing signals output thereto from the mapper; and
the receiving device further comprises a radio frequency section for converting a radio signal of a predetermined frequency output thereto from the receiving antenna into an analog signal.

18. The system according to claim 17, wherein
the transmitting device further comprises a digital analog converting section for converting a digital signal output thereto from the encoder into an analog signal, and
the receiving device further comprises an analog digital converting section for converting the analog signal output thereto from the radio frequency section into a digital signal.

19. The system according to claim 18, wherein
the transmitting device further comprises a radio frequency section for converting the analog signal output thereto from the digital analog converting section into a radio signal, and
the receiving device further comprises a decoder provided with an initializing section, a solution candidate calculating section, a solution candidate selecting section, a distance calculating section, and a distance comparing section, and is configured to decode a SDM code which is a digital signal output thereto from the analog digital converting section into a signal before being multiplexed in channel.

20. The system according to claim 19, wherein
the transmitting device further comprises a transmitting antenna for transmitting a radio signal output thereto from the radio frequency section to the receiving device, and
the receiving device further comprises a demapper for converting the signal output thereto from the decoder into transmission data, and outputting the transmission data to the outside.

* * * * *